March 6, 1973   R. A. MACUR   3,719,576
ELECTRODE FOR MEASURING CO₂ TENSION IN BLOOD AND OTHER
LIQUID AND GASEOUS ENVIRONMENTS
Filed Jan. 29, 1971   2 Sheets-Sheet 1

INVENTOR
ROBERT A. MACUR

BY *Winott G. Hohenfeldt*

ATTORNEY

March 6, 1973 R. A. MACUR 3,719,576
ELECTRODE FOR MEASURING CO₂ TENSION IN BLOOD AND OTHER
LIQUID AND GASEOUS ENVIRONMENTS
Filed Jan. 29, 1971 2 Sheets-Sheet 2

INVENTOR
ROBERT A MACUR

BY

ATTORNEY

United States Patent Office 3,719,576
Patented Mar. 6, 1973

3,719,576
ELECTRODE FOR MEASURING CO₂ TENSION IN BLOOD AND OTHER LIQUID AND GASEOUS ENVIRONMENTS
Robert A. Macur, Milwaukee, Wis., assignor to General Electric Company
Filed Jan. 29, 1971, Ser. No. 110,957
Int. Cl. G01n 27/30
U.S. Cl. 204—195 P                                    11 Claims

ABSTRACT OF THE DISCLOSURE

A sensor of the partial pressure of carbon dioxide in blood, other fluid, or gaseous mixture comprises a reference half-cell and a sensing half-cell immersed in a common electrolyte comprising chloride and bicarbonate ions. The sensing half-cell may be palladium-palladium oxide (Pd-PdO) or iridium-iridium oxide (Ir-IrO) and the reference half-cell may be silver-silver halide. The sensing half-cell is a wire coated at its distal end with its own oxide. The reference half-cell may be a silver tube which is coated on its tip with silver halide and slipped over an insulated section of the wire. The distal ends of the tube and wire are dipped into electrolyte which adheres and then into a polymer which forms a carbon dioxide permeable and ion-impermeable membrane or barrier on the whole assembly when the polymer cures. The proximal ends of the silver tube and wire are connected by means of a coaxial cable to a high impedance voltmeter which is calibrated in terms of partial pressure of carbon dioxide in millimeters of mercury. Means are provided for standardizing the sensor and keep it equilibrated during storage.

BACKGROUND OF THE INVENTION

When a human subject is anesthetized the pH, oxygen and carbon dioxide levels of the blood must be held within predetermined limits. These parameters are ordinarily controlled by adjusting the concentrations of the individual gases comprising the inhaled mixture and by controlling the subject's ventilation depth and respiration rate. Heretofore, the attending anesthesiologist would observe certain clinical signs which are indicative of the subject's respiration and make adjustments as required. By the time the signs were pronounced enough to observe, however, any of these important parameters could be near a critical limit; so that a considerable time would elapse before it would be restored to normalcy. Of course, more time elapsed before the anesthesiologist knew if he had overcompensated and had the parameters trending toward their opposite limits. These problems can be met only partially by performing a blood-gas analysis with conventional laboratory techniques on blood drawn from the patient since, even if the analysis were accurate, the actual blood-gas condition would in all probability have changed signicantly from the time of taking the sample.

It is medically useful to known the blood parameters mentioned. They are important and interrelated. The pH value, indicating the acidity and alkalinity levels of the blood, is very critical since the patient is in a serious condition if this parameter goes outside. the pH range of 6.8 to 7.8. In view of the importance of measuring pH, new pH sensors have been developed and are described in co-pending applications, Ser. No. 33,198, filed Apr. 30, 1970 and Ser. No. 81,314, filed Oct. 16, 1970 both of which are assigned to the assignee of this application.

Blood pH varies will the carbon dioxide level of the blood. When carbon dioxide level rises, the blood becomes more acidic and pH declines numerically. When the carbon dioxide level falls, the blood becomes more alkaline and pH rises numerically. However, blood is highly buffered so that a large change in carbon dioxide level must occur before there is a considerable change in pH. This means that there is a considerable lag between the occurrence of inadequate or excessive ventilation and a manifestation of the condition by a large change in pH. However, experiments show that the carbon dioxide level of the blood changes rapidly and substantially in correspondence with changes in ventilation so it is evident that a real time in vivo sensor for carbon dioxide would be highly desirable.

SUMMARY OF THE INVENTION

A primary object of this invention is to provide a sensor for measuring the carbon dioxide tension in a gas mixture or other fluid either in vivo or in vitro.

Other objects are to provide a carbon dioxide sensor which is easy to manufacture, convenient to use, rugged, reliable, precise, accurate, highly sensitive, compatible with blood, and small enough to be introduced into a small isolated sample or into a blood vessel or other body tissue with minimum trauma to the subject.

A further object is to provide a sensor which is so inexpensive, compared to known devices in the same class, that it can be disposed of after a single use.

Another object is to provide a unique system for storing a carbon dioxide sensor prior to use such that it is maintained in a substantially gas-equilibrated state and may be gas and temperature equilibrated, tested and calibrated expeditiously before it is inserted in a subject.

In general terms, a preferred embodiment of the new sensor comprises either a palladium-palladium oxide electrode wire or an iridium-iridium oxide wire which has a layer of its own oxide formed on at least a part of its length and preferably near its distal end. Hereinafter, the electrode wire will be called a core for convenience and to signify that it may have various configurations.

In the preferred embodiment the core is an iridium or a palladium wire which has an insulating coating over most of its unoxidized region. A silver tube is slipped over this coating. The distal end of the tube adjacent the oxide layer of the core has a silver halide layer preferably silver chloride, formed on it and as such it acts as a reference half-cell or electrode in conjunction with the same electrolyte in which the oxide coated wire is immersed.

The proximal end of the core is connected to the center conductor of a coaxial cable and the corresponding end of the silver tube is connected to the braid of the cable. The opposite end of the cable plugs into a high impedance voltmeter whose scale is calibrated in terms of partial pressure of $CO_2$ in millimeters of mercury.

The electrolyte in which the tip or distal ends of the sensor electrodes are immersed is preferably a film forming type which adheres when the tip is dipped into an aqueous electrolyte solution during assembly. The aqueous electrolyte film is isolated from the fluid under going $CO_2$ measurement by a thin carbon dioxide permeable membrane which is also applied by dipping almost the whole length of the sensor assembly in a polymer solution from which the solvent volatilizes to form the waterproof gas permeable but ion impermeable membrane. The electrolyte film is thereby confined.

After assembly, the sensor is inserted in a disposable plastic tube which is filled with saline or a solution which has about the same composition as the electrolyte within the sensor. This has several purposes including preventing loss of fluid by evaporation through the thin membrane of the sensor during storage. The plastic tube is also permeable to $CO_2$ in which case the solution which it contains is kept in constant equilbrium with $CO_2$ of known partial pressure in a gas mixture in which the sensor is stored. The solution within the plastic tube is thereby equilibrated with $CO_2$ at a pressure approximating that expected in the blood. The whole sensor assembly is finally placed in a sealed plastic container to maintain sterility. Immediately before the sensor is used it is removed from the plastic container and together with the saline filled tube the sensor is inserted in a heated socket which has its temperature controlled at 37° C. or body temperature. When the tube and sensor are temperature equilibrated, the measuring instrument is adjusted to read the calibration gas concentration and then the sensor may be inserted into the blood stream to give an accurate reading within its response time constant. A small wire is also sealed into the wall of the plastic tube and contacts the solution therein. The free end of this wire can be touched on a special electrode of the readout voltmeter before the sensor is calibrated. If touching the wire on the meter terminal produces a meter reading, it constitutes an indication that the gas permeable, ion impermeable membrane is unsound and the sensor should not be temperature equilibrated or used.

How the foregoing objects and other more specific objects of the invention are achieved will appear from time to time throughout the course of the ensuing detailed description of an embodiment of the invention taken in conjunction with the drawings.

DESCRIPTION OF A PREFERRED EMBODIMENT

Figure 1:
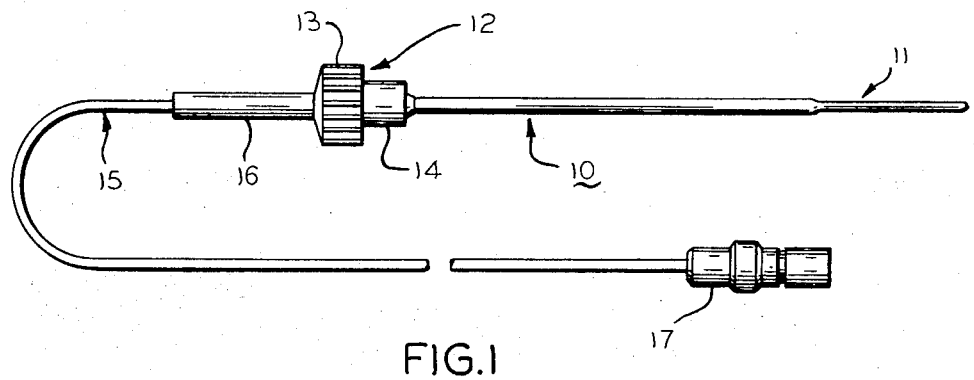
FIG. 1 is a plan view of the new carbon dioxide sensor assembly as it appears when it is ready for attachment to a readout instrument and for insertion in a blood vessel or other vessel containing fluid or gas.

FIG. 1 shows a carbon dioxide partial pressure sensor comprising an elongated composite electrode which is generally designated by the numeral 10. The distal end or tip 11 is the active end and is located in the blood stream during use if it is the real time monitoring of blood $CO_2$ level in vivo that is of interest. Of course, the sensor may also be used to analyze for the partial pressure of $CO_2$ in a gaseous mixture or in a fluid other than blood which contains carbon dioxide.

The proximal end of the sensor 10 extends into a plastic cannula adapter 12 which has a knurled cap 13 and a cylindrical extension 14. Electrical connections between the components of sensor 10 and a coaxial cable 15 are made within adapter 12 and sealed as will be described in greater detail later. Coaxial cable 15 is surrounded by an insulating strain relief tube 16 which may be of any suitable flexible plastic. The cable 15 is terminated in a coaxial connector 17 which is conventional and which permits connecting the sensor to a readout instrument which will be discussed later.

The sensor 10 may be used to determine carbon dioxide level of a sample of blood or other fluid which has been extracted from the body, but it is used most advantageously for monitoring $CO_2$ level of the blood directly in the body. The sensor is introduced into the blood stream by passing it through a cannula, not shown, which perforates the subject's tissue and the underlying wall of the blood vessel. The cannula is a standard type which is suitably socketed at its external end to receive the cylindrical extension 14 of the plastic sensor adapter to thereby make a seal against loss of blood. The active tip or distal end 11 of the sensor extends into the blood stream beyond the tip of the cannula and is always in contact with flowing blood.

The new sensor accurately and precisely measures the partial pressure of carbon dioxide in blood or other fluid over a wide range so it may be used to measure either venous or arterial blood carbon dioxide levels.

Figure 2:
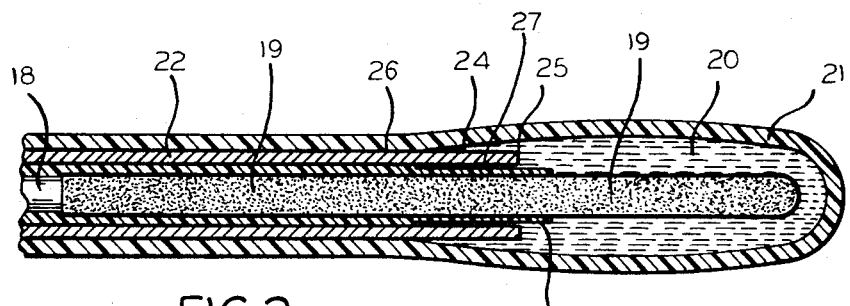
FIG. 2 is an enlarged fragmentary cross section of the distal tip of the sensor.

The construction of the sensor may be understood most readily by examining the distal end 11 as in FIG. 2 where it is shown magnified. It is seen to comprise a number of substantially concentric elements the center one of which is a metal core wire 18 which is coated with its own oxide over part of its length extending back from the tip as indicated by the stippled region 19. This core wire 18 may be selected from the class of palladium and iridium. The core wire 18 may also comprise a coating of one of these metals or alloys thereof on some other base metal. The electrode core may have configurations other than a wire; for instance, it could be a tube or a flat strip so core wire 18 will merely be identified as core 18 hereinafter. For intravascular work it should have a small diameter preferably in the range of .001 inch to .060 inch although increasing or decreasing its size does not affect its sensitivity to pH changes by which it indirectly determines carbon dioxide pressure changes that occur in the electrolyte medium 20 which surrounds the electrode tip. Alloys of iridium or palladium containing as little as 5% of these elements with gold or platinum may also be used alone or may be deposited on a substrate of another metal or non-metal to serve as electrode 18. A method for forming the oxide coating on core 18 will be discussed later.

Core 18 can be seen in FIG. 2 to be immersed in an electrolyte film which is marked with the numeral 20. This electrolyte film is preferably aqueous and is comprised of .01 molar sodium bicarbonate and 1.0 molar sodium chloride in this example. Bicarbonate ions can be derived from other compounds too. Chloride ions may be derived from any compound that does not interfere with the acid-base reaction. The molarity of the electrolyte is not critical but is a trade-off between sensitivity and a reasonably short time constant. The electrolyte compounds in solution may be mixed with a hydrophilic surfactant to wet the sensor elements and a thickening agent may be added to enhance adhesion when dipping but this is not necessary in all cases.

Encapsulating the electrolyte 20 as well as the oxided region 19 of core 18 is a carbon dioxide permeable membrane 21 which may be only a few thousandths of an inch or less thick. The oxide coated core 18 by itself constitutes a half-cell whose potential varies in response to variations in pH of any fluid surrounding it as is described in the present inventor's copending application for a pH electrode cited earlier herein. In the present case, however, the electrolyte 20 is the fluid whose pH is being sensed. The pH of this fluid is altered by permeation of carbon dioxide through the membrane 21 from the surrounding blood or other carbon dioxide containing gas mixture or fluid, in which the sensor is immersed. Since the carbon dioxide permeates the membrane 21 and the partial pressure of this gas in the sample equilibrates in the electrolyte, it follows that the voltage produced by the sensor is related to carbon dioxide pressure and can be interpreted in terms of carbon dioxide partial pressure.

As is well known, the voltage of the sensing half-cell such as the one just described cannot be easily measured directly nor is its absolute value readily determinable for various reasons including the diminution of the voltage to substantially zero due to polarization when current flows through any instrument that is used to detect the voltage. It is therefore necessary to measure relative voltage changes that are effected by pH changes corresponding with carbon dioxide changes as compared with the voltage derived from a reference electrode that is coupled with the sensing electrode through the isolating electrolyte 20.

The reference electrode in this example is of the silver-silver chloride type, although it could be any halide except fluoride. The reference electrode in this illustrative embodiment is comprised of a thin silver tube 22 which is slipped over the oxide coated core 18 and is electrically isolated from it by a thin insulating tube 23. The insulating coating 23 does not, of course, extend over the whole length of the oxide coated region since this region must be in conductive relation with the electrolyte 20. The distal end of silver tube 22 has a silver chloride layer deposited on its inside and outside prior to the time that the tube is assembled with the central core. The length of this silver chloride layer is demarked between the lead lines from reference numerals 26 and 25. By way of example, the silver tube may have a bore of 20 mils and may be chlorided over 250 mils of its length although the length of chloriding can be varied.

Beecause silver tube 22 fits loosely over insulating tube 23 a thin concentric gap 27 is created between the silver chlorided region 25–26 and the outside of the insulating tube. This thin gap admits some electrolyte 20 as shown to enlarge the ion conduction path between the silver chlorided region and the oxide coated region 19 of core wire 18.

Figure 3:
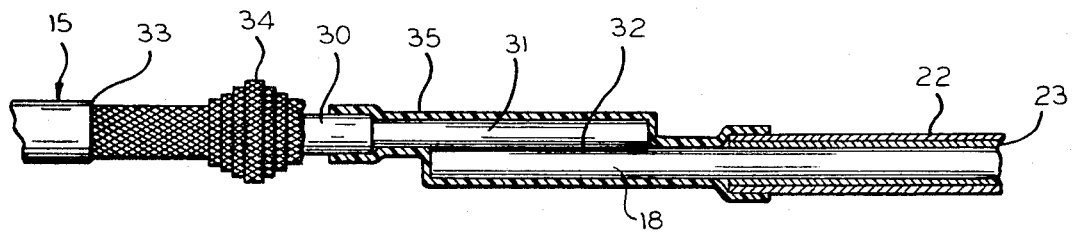
FIG. 3 shows the sensor in one stage of assembly so as to reveal certain features of its construction.

How the conductive elements of the sensor are connected at their proximal ends to coaxial cable 15 can be seen best in the subassembly depicted in FIG. 3. Note here that the insulation 30 of coaxial cable 15 is stripped from the central wire 31 of this cable and the wire is connected by soldering or other suitable means directly to the bare sensor electrode core wire 18 at the interface 32 of these two wires. In preparation for connecting, as just described, the outer insulating layer 33 of coaxial cable 15 is stripped and the metal braid 34 of the cable is rolled back as shown in FIG. 3.

Figure 4:
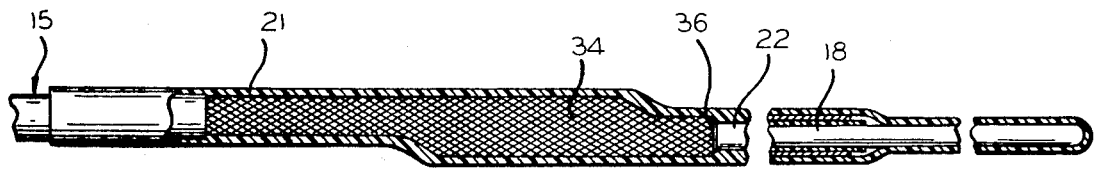
FIG. 4 shows the sensor in a stage of assembly which is later than that depicted in the previous figure.
Figure 5:
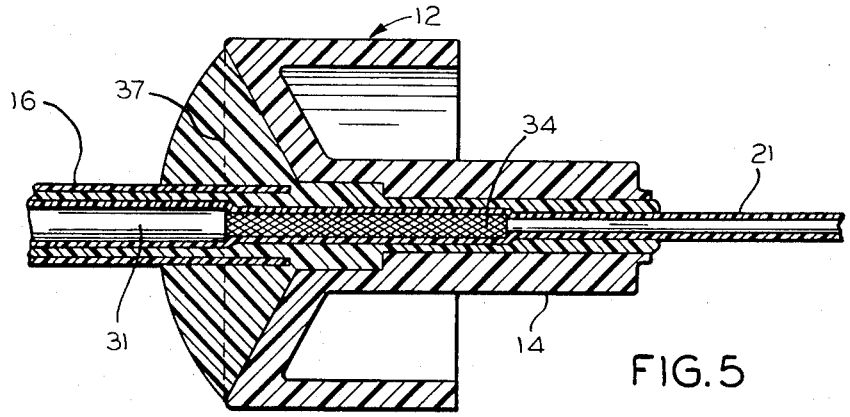
FIG. 5 is a longitudinal cross section of part of the sensor assembly.

The silver tube 22 and the underlying insulating tube 23 are substantially coextensive with the core 18. In other words, silver tube 22 is insulated from sensor core 18 at the proximal end under discussion as well as at the distal end of the sensor. After the coaxial cable center wire 31 is soldered to sensor core 18, as described above, a tube 35 consisting preferably of a heat shrinkable polymer, such as Teflon or polyethylene is slipped over the sensor from its distal end and subjected to heat to shrink it and provide an insualting layer as shown. It is evident from inspection of FIG. 3 that heat shrinkable tube 35 effects an insulating bridge between core insulation 30 of the coaxial cable and the exterior of the silver tube 22. When the outer insulating layer 33 of coaxial cable 15 is removed, the underlying metallic braid 34 is exposed and is rolled back on itself as illustrated in FIG. 3. After the coaxial cable central wire 31 and core 18 are soldered and insulated as described above, the cable braid 34 is extended so as to make electrical contact with the exterior of silver tube 22. The end of the braid is then electrically connected by any suitable means to the silver tube in the region marked 36 in FIG. 4. Thus, there are two conductive paths leading away from the sensor, one of which is the sensor core 18 connected to the central wire 31 of the coaxial cable and the other of which is the silver tube 22 connected to the metallic braid 34 of the cable 15.

The distal end is then dipped in the film forming electrolyte 20 which coats the oxide coated tip 19 as well as the chlorided region on the outside of silver tube 22. The distal end should be dipped in electrolyte sufficiently far to coat it with the electrolyte at least as far as the terminal point 26 of the silver chloride coating 24 on tube 22 and the concentric gap 27 between tube 26 and electrode core 18 must be filled with electrolyte 20.

With a quantity of immiscible aqueous electrolyte adhering to its distal end, the sensor is dipped into a membrane forming polymer which is dissolved in a volatile solvent. The sensor should be immersed in the polymer solution to such depth that it extends over the end 33 of the outside insulating layer of the coaxial cable at the proximal end of the sensor. The solvent is then allowed to evaporate from the polymer coating which dries and forms a relatively tough thin membrane. Although the membrane 21 is present primarily for the purpose of conducting $CO_2$ from the sample fluid to the electrolyte 20 at the active tip of the sensor, it is, nevertheless, desirable to deposit the membrane on the sensor as far back as the end 33 of the coaxial cable insulation because the membrane contributes to the electrical insulation of the assembly and acts as a blood compatible surface. Any foreign electrolytes or other contaminants that enter the sensor assembly might develop spurious voltages which would be detrimental to stable and precise operation of a high impedance device such as this sensor. When the sensor is in the stage of assembly thus far described, the insulating strain relief sleeve 16 and the plastic cannula adapter 12 are slipped over the entire sensor from the distal end. Then all free spaces are filled with a sealant such as epoxy resin 37 and the sensor is complete.

A preferred material having a high $CO_2$ transfer coefficient out of which to form the carbon dioxide permeable membrane 21 is a silicone-polycarbonate block copolymer such as is described in U.S. Pat. No. 3,189,622 which is assigned to the assignee of this application. This material may be dissolved in either chloroform, methylene chloride or ethylene chloride which are all volatile. The sensor is then dipped into the solution one or more times, depending on the concentration of the solute, and allowed to air dry after each dip so that a continuous hole-free membrane will be formed. Other blood compable $CO_2$ permeable and ion impermeable polymeric materials may be used in place of the aforementioned material.

Figure 6:
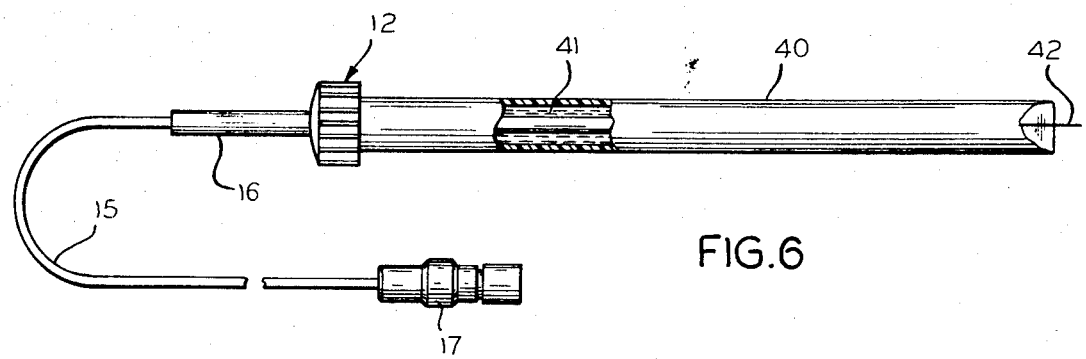
FIG. 6 shows the completed sensor inserted in a fluid filled tube as is the case when it is in storage or undergoing calibration immediately prior to use.

It will be evident that a sensor such as that described above will be subject to loss of moisture by evaporation from electrolyte 20 during the period between manufacture and use. For this and other reasons which will be explained later, the sensor is inserted in a casing which in this case is a plastic tube 40, see FIG. 6, which is filled with saline or other fluid 41 such as a solution of the same chemical components which are found in the electrolyte 20 solution inside of the sensor tip. The solution in plastic tube 40 should preferably be isotonic with respect to the electrolyte in the sensor. The plastic tube 40 may be made of polypropylene or other material that is permeable to carbon dioxide. The fluid 41 is retained in tube 40 during storage of the sensor by virtue of the proximal end of the tube making a tight slip fit seal with cylindrical extension 14 of cannula adapter 12 as can be seen in FIG. 6. Before tube 40 is filled with fluid 41, a thin wire 42 is sealed into the end of the tube so that one end is in contact with fluid 41 and the other end is exposed. The purpose of wire 42, as will be explained in greater detail later, is to permit making an electrical integrity test of the sensor before it is temperature equilibrated and calibrated prior to use in a subject. There will also be a further discussion later of how fluid 41 is kept in the condition wherein it has carbon dioxide dissolved in it to produce a predetermined partial pressure which aids in calibrating the sensor immediately prior to use. The partial pressure of carbon dioxide in fluid 41 is close to that which is expected to be encountered in a subject whose blood $CO_2$ partial pressure is being monitored. This facilitates calibration before use.

Other ways of sealing the tube 40 to the sensor could also be used in place of plastic adapter extension 14. For instance, an O-ring could be slipped over the sensor at any point along its length so it could be accepted by a tube of appropriate size. In any case the volume of fluid 41 inside of tube 40 should be minimized to speed up gas equilibration.

Figure 8:
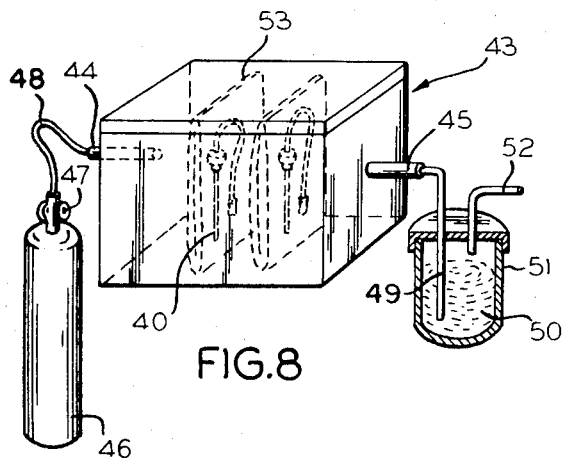
FIG. 8 shows a chamber in which sensors of the type herein described may be stored in a controlled atmosphere and kept in gas equilibration prior to calibration and use.

After tube 40 is in place on the sensor as depicted in FIG. 6, the entire sensor and its connecting cable 15 is deposited in a sealed package 53, see FIG. 8, made of polyethylene or other material that is permeable to carbon dioxide. A gas mixture of known carbon dioxide concentration and the balance being air may be permeated into the envelope 53 by means of the permeating chamber shown in FIG. 8. This package may then be subjected to gamma radiation to sterilize the contents which are up to that time clean but not sterile.

A sensor which is packaged as described above and surrounded in a gas mixture of carbon dioxide and air at ambient pressure will maintain the carbon dioxide in the tube 40 so that the sensor may be calibrated while inside the tube 40, thereby keeping the sensor in a gas pressure stable and sterile condition during calibration.

It is desirable that the electrolyte of the sensor be equilibrated at substantially the level of blood carbon dioxide to expedite calibration, so the packaged electrodes are kept by the using medical facility in a covered box which is marked with the reference numeral 43 in FIG. 8. This box has a gas inlet tube 44 and an outlet tube 45. A calibrating gas flows into box 43 by way of connecting tube 44 from a gas tank 46 which is equipped with a conventional regulator 47. A rubber tube 48 conducts the gas from regulator 47 to inlet tube 44 of box 43. Gas pressure within box 43 may be maintained near atmospheric pressure by terminating outlet tube 45 with a tube 49 whose lower tip is immersed in a few millimeters of water 50 which is in a container 51. This container is equipped with a discharge tube 52. It will thus be evident that gas pressure within box 43 will be substantially equal to the atmospheric pressure which prevails at the time an electrode package is to be withdrawn from the container and the sensor calibrated for use. Other means such as a pin hole inlet orifice may be used to control the flow of gas at near atmospheric pressure through box 43.

In accordance with Dalton's law, the partial pressure of a gas in a mixture of gases is proportional to its mole fraction. In this, case the calibrating gas in tank 46 is chosen so that the mole fraction of carbon dioxide is 0.06. At a given atmospheric pressure and temperature, carbon dioxide will thus produce a constant known partial pressure. Thus, if standard atmospheric pressure is assumed to prevail where the sensor is to be calibrated, it is only necessary to substract the partial pressure of water vapor which is 47 millimeters of mercury at 37° C. body temperature. Assuming that atmospheric pressure is 760 millimeters of mercury. The remainder will be 713 millimeters of pressure after the 47 millimeters of mercury pressure due to water vapor are subtracted. This total pressure of 713 millimeters of mercury is equal to the sum of the partial pressures of oxygen, nitrogen, carbon dioxide, and the rare gasses. Thus, it turns out that when one is calibrating at a total gas pressure of 713 millimeters of mercury there is a corresponding partial pressure for $CO_2$ of about 43 millimeters of mercury, which is about the center point of the $CO_2$ range expected in the blood. Of course, calibration of the sensor must take place within a short time after the package 53 is removed from the gas ambient within box 43 or the gas dissolved in fluid 41 within plastic tube 40 will no longer be equilibrated with the standard gas.

Figure 9:
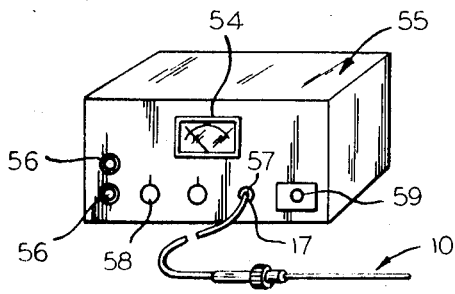
FIG. 9 is a perspective view of the carbon dioxide level readout instrument with the sensor connected.

It was mentioned earlier that the voltage produced when the sensor is deposited in blood is displayed on a voltmeter such as the one marked 54 in the instrument 55 which is shown in FIG. 9 and is calibrated in terms of $CO_2$ pressure. This instrument has a high input impedance amplifier, not shown, which amplifies the voltages received from sensor 10 and uses them to drive meter 54. Instrument 55 is also used for calibrating the sensor 10. For that purpose the instrument is provided with a number of sockets 56 in which the sensor may be inserted for calibration. The interiors of sockets 56 are held at a temperature of 37° C. which approximates human body temperature. With the coaxial cable connector 17 plugged into an appropriate connector socket 57 in instrument 55 and with the fluid filled plastic tube 40 in place on sensor 10, the tube and sensor are inserted jointly into one of the thermostatically controlled heating sockets 56. Since the partial pressure of carbon dioxide in fluid 41 within tube 40 is equilibrated at 43 millimeters of mercury. The balancing potentiometer knob 58 of the instrument may be adjusted until the meter scale reads 43 which corresponds with the $CO_2$ pressure expressed in millimeters of mercury. Thus, calibration of the sensor is made each time at a fixed temperature and at a known partial pressure of $CO_2$ which is closed to that which is expected in the blood. The partial pressure of carbon dioxide in fluid 41 does not change appreciably during the short calibration time or a correction could be made easily if it did change. The gain of the sensor may be matched with the gain of the readout instrument amplifier, not shown, by means of a suitable gain select knob, not shown. Plastic tube 40 is removed after calibration is complete and the sensor 10 is inserted through a cannula which has previously been inserted in the blood vessel and partial pressure of carbon dioxide of the blood may be thereafter read directly from meter 54.

Prior to going ahead with calibration procedure just described, and before fluid filled tube 40 is removed from sensor 10, the test wire 42 which extends from fluid filled tube is contacted on a terminal 59 in the front of instrument 55. This terminal is connected to one of the input terminals to the meter amplifier within the instrument through the agency of a circuit, not shown, which operates at a frequency of about 1000 Hz. so as to not disturb the electrolyte balance in the sensor. Thus, if the meter deflects when the tip of wire 42 extending from plastic tube 40 is contacted on terminal 59, such deflection indicates that the sensor should be discarded rather than calibrated. This avoids the possibility of inserting a defective sensor in a patient in which case another one would have to be substituted after it was discovered by observing spurious readings or no reading on meter 54.

As manufactured, different sensors may shown a different output voltage at a single calibration point. In other words, different sensors of the same type may have a slightly different gain. Thus, when calibrating before use as described above, the single calibration point, such as point 60 in the FIG. 7 graph of output voltage, may have a greater or lesser ordinate for different sensors but their gain-slope lines would remain parallel to the typical line 61 of the graph. To preclude an erroneous readout, each sensor is labeled with a letter representing a readout instrument that must be set to cause its calibration point to coincide with a selected point such as point 60. The readout instrument gain adjustment knob is marked with gain settings corresponding to the factory test gain settings which are indicated by the lettered label on each individual sensor package so that gain can be set before calibration begins.

Figure 7:
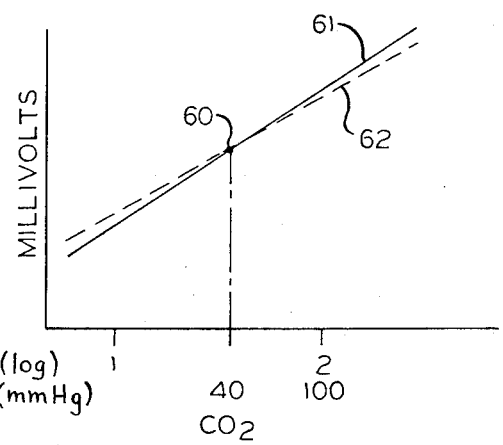
FIG. 7 is a graph of partial pressure of carbon dioxide versus millivolts output from the sensor.

The slope of the readout graph may also differ a little between sensors as suggested by the different slope of dashed line 62 as compared with line 61 in FIG. 7. Variances in slope are immaterial, however, because even near the end points the difference in ordinates is small and reasonably close to the calibration point which is about in the center of the range of $CO_2$ levels encountered in blood. The clinical range of $CO_2$ partial pressure in blood is about 10 to 160 millimeters of mercury, but a smaller range is more common.

Particular information for preparing and processing some of the components of the sensor will now be discussed in detail. Consider first preparation of the oxide coating 19 on the palladium or iridium centrol core wire 18 or electrode of the sensor. Several methods for preparing this wire are described in the copending application of the present inventor which was cited above. An illustrative method will, nevertheless, be set forth here. A commercially pure but otherwise untreated iridium or palladium wire is immersed in either an aqueous solution of potassium hydroxide or sodium hydroxide. The hydroxide concentration is not critical and may range from 1 N to saturation. After withdrawal from the solution, the wetted portion of the wire is heated in an oven to approximately 800° C. in oxygen or an air ambient to form an iridate or a pallidate coating. The preferred heating time at 800° C. is from 5 to 30 minutes. A longer time is acceptable, but a shorter time sometimes results in a less stable electrode. The above process is repeated until a blue-black coating is formed. The heat treatment may be carried on anywhere in the temperature range of 700° C. to 1100° C. for iridium and at about 750° C. for palladium although 800° C. is preferred for both and produces the most uniform results. Palladium oxide volatilizes when over 800° C. A wire treated in this manner is cooled and then immersed in distilled water from about 24 hours whereupon the iridate or pallidate breaks down into either iridium or palladium oxide and sodium or potassium oxide. The latter oxides convert to sodium hydroxide or potassium hydroxide, respectively, in water and are dissolved off. The remaining coating is either iridium or palladium oxide 19, depending upon the elemental nature of the wire, and an undetermined amount of water of hydration. The electrode 18 is then dried and is ready for being insulated over part of its length as described above after which it can be incorporated in the sensor assembly.

A good material for the carbon dioxide permeable membrane 21 is an organo-polysiloxane-polycarbonate block copolymer which is described in U.S. Pat. No. 3,189,622 and is assigned to the assignee of this application. A membrane of this material has a high transfer coefficient for carbon dioxide. As generally indicated above, a 35% weight/volume solution of the copolymer is made using a volatile solvent such as either chloroform, methylene chloride or ethylene chloride. After the electrolyte film 20 is deposited by dipping the sensor tip, the whole sensor assembly is dipped into this copolymer solution one or more times to deposit a layer approximately 0.5 mil to 1.0 mil thick, after which it is allowed to dry. The material had good insulating qualities so it is desirable to dip the sensor deeply enough to deposit a membrane layer all the way back onto the part of coaxial cable 15 which is covered by sleeve 16. Other carbon dioxide membranes can by substituted for the material discussed in the preceding paragraph such as styrene butadiene, Viton rubber (poly(vinylidene fluoride-hexafluoropropylene)) and silicone rubbers deposited out of a volatile solvent. With a membrane of the above indicated thickness, the minimum partial pressure of carbon dioxide at which the sensor will operate is about 5 millimeters of mercury. There must always be some presure driving force to permeate the membrane.

The silver-silver halide electrode may take various forms other than the chloride tipped silver tube 22. For example, a fine silver wire may be halide coated over part of its length and then spiraled around insulating layer 23 which surrounds oxide coated centrol wire 18. In such case, the halide coated region, preferably silver chloride, must be spaced from the oxide coating 19 of the central wire and both coatings must be in contact with electrolyte 20. An insulating tube or otherwise shaped reference electrode can also be made by depositing silver on its entire surface or in a strip and chloriding the same.

Methods for forming silver chloride coatings are well known and available from the literature.

The palladium or iridium electrode may have configurations other than a thin wire such as 18 on which there is an oxide coating 19. For example, it may be a tube, a flat strip or a disc although this geometry may not be as advantageous as a wire for in vivo use of the sensor. Moreover, a core of material other than either palladium or iridium may be used provided an impervious layer of one of these elements is deposited on the core and the layer is oxided as prescribed above. Rhodium and platinum which are in the same group in the periodic chart cannot be substituted for palladium or iridium or an in operative sensor will result.

The electrolyte 20 film forming solution may be prepared by making a 0.005 N to 0.01 N solution of sodium bicarbonate in a 0.15 N to 1.0 N solution of sodium chloride. This solution may be mixed with 1 gram of anionic wetting agent. The film forming solution may be anionic, cationic, or neutral.

This film forming agent has suitable adherence to the sensor tip when it is dipped in the solution prior to application of outside membrane 21.

The potential of the silver-silver chloride reference half-cell used herein is about 240 millivolts with reference to a standard hydrogen cell and remains constant since the concentration of the chloride ions in the electrolyte 20 remains constant. As pH increases with decreasing $CO_2$, the potential measured by the milivoltmeter instrument 55 declines at a slope of about $-59$ mv. The potential actually measured is the difference between that of the sensing electrode and the silver chloride electrode. In actual cases the slope is about 43 mv. change per unit log change in $CO_2$. The temperature coefficient has been measured to be about $-1.07$ mv./C °. A temperature correction need not ordinarily be made when the sensor is in use because body temperature is reasonably stable but it is preferably provided for in the instrumentation.

The illustrative embodiment of the new carbon dioxide sensor described above and the method of calibrating and using it are directed primarily to a sensor whose design is particularized for measuring carbon dioxide partial pressure of blood and other body fluids in vivo. Those skilled in the art will appreciate, however, that the sensor and its calibrating techniques can be adapted to measuring pure carbon dioxide pressure and the partial pressure thereof in various media. For example, the sensor may be used to measure carbon dioxide generation as an indicator of fermentation activity in beer and wine making processes, or it may be used to monitor carbon dioxide gas concentrations in spacecraft rebreather systems, or as a pollution control device in connection with analyzing flue and exhaust gases. The scope of the invention is to be determined only by interpretation of the claims which follow.

I claim:
1. A carbon dioxide sensor comprising:
    (a) a first electrode including an element selected from the class consisting of iridium and palladium,
    (b) an oxide of the element in electric contact with said electrode,
    (c) a second silver electrode having a region thereof coated with silver halide, said halide coating and oxide being spaced from each other and said electrodes being insulated from each other,
    (d) an aqueous electrolyte including bicarbonate ions and corresponding halide ions, said electrolyte being in mutual contact with said oxide and said silver halide,
    (e) a carbon dioxide permeable membrane encompassing at least that portion of the electrolyte which is in contact with the oxide and halide coatings of the respective electrodes.
2. The sensor set forth in claim 1 in which:
    (a) the first electrode is a thin core wire having a coating of its own oxide formed on a part thereof.

3. The sensor set forth in claim 2 in which:
(a) said silver electrode is in the form of a tube which is substantially concentric with said core electrode and in non-conductive spaced relationship therewith,
(b) a portion of said silver adjacent said oxide coating having said silver halide coating on it.

4. The sensor set forth in claim 1 in which:
(a) said silver halide is silver chloride.

5. The sensor set forth in claim 1 wherein:
(a) the carbon dioxide permeable membrane is selected from the class of silicone rubber and polysiloxane-polycarbonate copolymer.

6. A carbon dioxide sensor comprising:
(a) a wire-like electrode including an element selected from the class consisting of iridium and palladium,
(b) a coating of the oxide of the selected element on said electrode at the distal end thereof,
(c) a tubular electrode of silver surrounding said wire electrode and having a silver chloride coating on at least the outside of its distal end,
(d) an insulating layer betwen said tubular electrode and said wire to maintain said electrodes and the respective chloride and oxide coatings thereof in spaced relation with each other,
(e) an aqueous electrolyte including bicarbonate ions in contact with at least a part of the oxide and chloride coatings on said electrodes, and
(f) a carbon dioxide permeable membrane encapsulating said electrolyte.

7. The invention set forth in claim 6 wherein:
(a) said carbon dioxide permeable membrane is selected from the class consisting of silicone rubber, poly (vinylidene fluoride-hexafluoropropylene), styrene butadiene, and polysiloxane-polycarbonate block copolymer.

8. A carbon dioxide sensor and means for equilibrating the sensor comprising:
(a) a thin flexible electrode core wire including elements selected from the class consisting of palladium and iridium,
(b) an oxide of the selected element forming a coating on the distal end of said electrode core wire,
(c) an insulating layer on at least a part of said wire excluding at least a part of the oxide coating at the distal end,
(d) a silver electrode adjacent said insulating layer, said silver electrode having at least a part thereof coated with silver halide which is spaced from said oxide,
(e) an aqueous electrolyte bridging said oxide and halide,
(f) a carbon dioxide permeable membrane encapsulating said electrolyte and sealed to at least one of said electrodes,
(g) an insulated cable having one end terminating in a connector and having at least two conductors which are connected respectively to the said electrodes at the proximal end thereof,
(h) an adapter means surrounding said sensor electrodes,
(i) said means for equilibrating the sensor comprising a gas permeable casing means having a fluid therein, said casing means being sealed at one end sealingly engageable with the adapter means at its other end, said fluid and said casing means transporting equilibrating gas, to said membrane and preserving the water content of said electrolyte.

9. The invention set forth in claim 8 wherein:
(a) a carbon dioxide permeable sealed container means contains said sensor and its casing means.

10. The invention set forth in claim 8 wherein:
(a) the fluid in said casing means is isotonic with the electrolyte of the sensor.

11. The invention set forth in claim 8 including:
(a) a conductor sealed in said casing means with one end thereof in contact with the fluid therein and the other end accessible from the outside of the casing means, said conductor facilitating a test of the electrical integrity of said sensor.

References Cited

UNITED STATES PATENTS

| | | | |
|---|---|---|---|
| 3,505,195 | 4/1970 | Nielsen et al. | 204—195 P |
| 3,357,908 | 12/1967 | Riseman et al. | 204—195 P |

OTHER REFERENCES

Leland C. Clark, Jr. et al.: Annals N.Y. Academy of Sciences, vol. 102, Art. 1, pp. 29, 30, 37 and 38 (1962).

GERALD L. KAPLAN, Primary Examiner

U.S. Cl. X.R.

128—2.1 E; 204—1 T; 324—51